(No Model.) 2 Sheets—Sheet 1.

W. A. McCOOL.
BROACHING IMPLEMENT.

No. 591,871. Patented Oct. 19, 1897.

Witnesses
Jno. H. Edwards
Arthur L. Bryant

Inventor
William A. McCool
By H. H. Bliss atty (No Model.) 2 Sheets—Sheet 2.

W. A. McCOOL.
BROACHING IMPLEMENT.

No. 591,871. Patented Oct. 19, 1897.

Witnesses
Wm. H. Edwards
Arthur L. Bryant

Inventor
William A. McCool
By
H. H. Bliss, atty.

UNITED STATES PATENT OFFICE.

WILLIAM A. McCOOL, OF BEAVER FALLS, PENNSYLVANIA.

BROACHING IMPLEMENT.

SPECIFICATION forming part of Letters Patent No. 591,871, dated October 19, 1897.

Application filed September 12, 1896. Serial No. 605,656. (No model.)

*To all whom it may concern:*

Be it known that I, WILLIAM A. MCCOOL, a citizen of the United States, residing at Beaver Falls, in the county of Beaver and State of Pennsylvania, have invented certain new and useful Improvements in Broaching Implements; and I do declare the following to be a full, clear, and exact description of the invention, such as will enable others skilled in the art to which it appertains to make and use the same, reference being had to the accompanying drawings, and to the letters of reference marked thereon, which form a part of this specification.

My present invention relates to improvements in broaching tools or implements adapted to remove from the interior of a tube any projections or ridges and to make the walls of the tube of uniform thickness at all points.

As is well known, owing to inaccuracy in the adjustment of parts by which blanks for the manufacture of drawn tubing are produced, or from wear on such parts, the walls of the tubular blank vary considerably in thickness; and when such a tube is passed between a mandrel and die the tendency is to increase the density of the metal at the points of greatest thickness and thereby produce a tube having its parts of different strength, which is objectionable. In welded tubes there is frequently a thickened rib-like projection extending along the inner surface of the tube in line with the weld.

To remove any such projecting ribs or enlargements, I have devised the implement illustrated in the accompanying drawings, in which—

Figure 1:
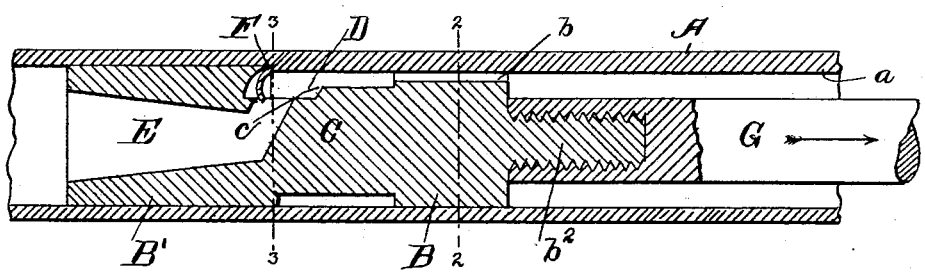
Figure 2:
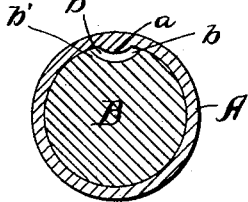
Figure 3:
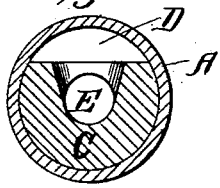
Figure 4:
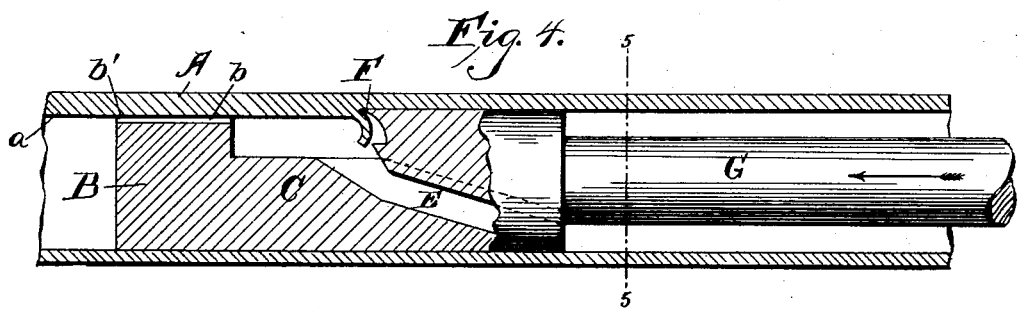
Figure 5:
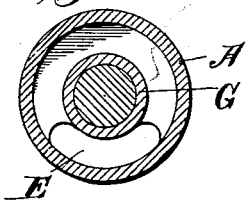
Figure 6:
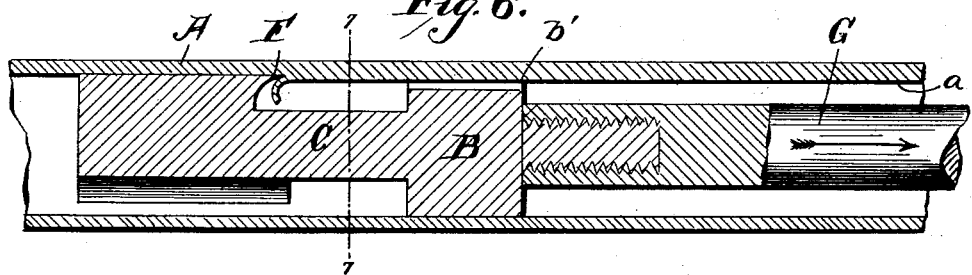
Figure 7:
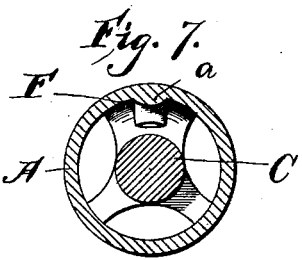

Figure 1 is a longitudinal sectional view through a section of tube, showing my improved implement therein. Fig. 2 is a sectional view on the line 2 2, Fig. 1. Fig. 3 is a similar view on the line 3 3, Fig. 1. Fig. 4 is a longitudinal section of a slightly-modified form, and Fig. 5 is a section on the line 5 5 thereof. Figs. 6 and 7 are respectively a longitudinal and transverse section of another modification.

In the drawings, A designates a tube formed by bending a sheet-metal blank and welding the longitudinal edges together, and $a$ designates the inwardly-projecting rib or portion of increased thickness extending along the line of the weld.

The broach or implement which I have devised for removing the projection $a$ consists of two end sections B B', connected by an intermediate reduced portion C. The end portions B B' are made, preferably, cylindrical in form and of the same diameter as the interior of the tube when smoothed, or after the rib $a$ has been removed, and to enable the forward section or end portion B to enter the tube a groove $b$, of such size as to receive said projection $a$, is formed therein. This groove $b$ extends the entire length of the said portion B and opens at its inner end into the chamber D, formed between the reduced connecting portion C and the walls of the tube A.

E designates a passage or duct which opens at one end through the outer rear end of the section or portion B' of the implement and has its inner end opening into the aforesaid space D. The forward end of this rear portion B' is provided with a cutter F, which is in line with the groove $b$ and so related to the inner end of the passage E that any cuttings produced thereby will, as the broach and tube are moved relatively to each other, pass from the chamber D, through such passage E, to the interior of the tube in rear of the broach. As shown, the passage E is preferably flared or enlarged toward its rear end, so as to provide against the cuttings filling the same and the chamber D and interfering with the action of the cutter. Preferably, also, the intermediate connecting portion C is of greater diameter adjacent to the forward end B of the broach than it is adjacent to the other end portion B' thereof, whereby there is formed a projecting surface $c$, which serves to guide the cuttings produced by the implement into the adjacent end of the passage E.

The broach may be attached to a mandrel G by any suitable means. In the drawings I have shown the portions B B' C as formed integral one with the other and the section B as having an integral projecting externally-threaded stem $b^2$ adapted to fit within a threaded socket formed in one end of the mandrel G, but various forms of attachment may be employed for securing together the broach and mandrel.

The operation of my improvements will be readily understood. The mandrel and broach being rigidly secured together, the tube may be held stationary and the mandrel moved longitudinally therethrough, or the mandrel and broach may be held stationary and the tube moved longitudinally as desired. I am thus enabled to remove any projections from the interior surface of the tube, leaving the walls of uniform thickness and the tube a perfect circle in cross-section.

While I have herein referred more particularly to the fact that this tool will be adapted for use in acting upon the concave interior of a tube, and particularly for removing the bead or thickened rib-like projection present in almost every lap-welded or butt-welded tube, yet I do not limit the use of a tool having my features of improvement to such uses.

I am aware of the fact that cutting-tools have been used or proposed for treating the interiors of tubes, each of which comprised a rotating head or carrier, together with one or more rotating cutting devices supported by the head, but a tool of the character herein is radically different, in a number of respects, from such as those just referred to. First, I provide a strong abutment to resist the lateral pressure exerted by or upon the cutter, this abutment consisting in the parts which are radially opposed to the cutter and which also bear against the interior surface of the tube. They may so bear either on lines passing diametrically through the axis, as in Figs. 1 and 3, or the abutting points may be on radial lines intersecting the side portions of the tube, as shown in Fig. 6. Again it will be seen that substantially the same principle of operation can be followed if the mandrel or power-transmitting bar G be inverted relatively to the head and the cutter, so that it will impart a push to them, instead of pulling, such a construction being shown in Fig. 4. So, also, there can be modification with respect to the relative position of the guide which I provide for preventing the cutter from rotating or torsional strain. As shown, this guide consists of the ribs or relatively-projecting ridges at $b'$, formed by cutting or otherwise making the groove $b$, these being adapted to move along by the side of the rib or bead-like projection $a$, such as is formed in making lap-welded or butt-welded tubing. One such modified position is shown in Fig. 4.

I am aware that it has been heretofore proposed to provide at the front end of a rotary boring or reaming bit a longitudinally-extending axially-arranged passage which communicated, through a series of radial passages, with a shallow circumferential groove arranged in rear of the reaming-cutter. With such a construction the cuttings are deposited in front of the bit and in the path of the advancing cutting-surface, and in case the tool is held in other than a vertical position the cuttings are moved longitudinally by the end of the tool.

As above pointed out, it is desirable that all of the cuttings be removed entirely from the path of the cutting edge, and this is not accomplished with such a construction as that above referred to.

By the arrangement of parts herein illustrated and described it will be seen that the cuttings are conducted rearwardly from the cutting edge and the implement is adapted to act when held in a horizontal position, as is most desirable in the class of work for which my improvements are particularly intended.

This invention is particularly intended for treating thin tubing produced by one or another of the several methods of manufacture. I have above described it as being used for treating lap-welded or butt-welded tubing. I use such tubing in drawing very thin tubes. The treatment provided for by the tool herein can be accomplished at an earlier or later step in the process of drawing, but I do not limit the present tool to removing the seam or rib of a lap-welded tube, as in tube manufacture it is often necessary to remove metal along one longitudinal line or another. The tubes are generally ten feet or more in length. It is impracticable to use a bar, supported at each end and extending entirely through the tube, for carrying the cutter, and as the tubes are often exceedingly thin it is not practicable to arrange two cutters diametrically opposite to each other and depend upon one to act as the recipient of the thrust of the other.

I avoid any attack upon the surface of the tube opposite the cutter by having an abutment with sufficiently-rounded surfaces to distribute the pressure over a large portion of the interior surface of the tube. This abutment in some cases may be directly opposite the cutter, as in Fig. 1, the head adjacent to the cutter being substantially circular in cross-section, so that the metal of the tube, no matter how thin, is saved from displacement along any lines, or from being cut or torn, and as this head is extended beyond the cutter for a considerable distance it serves as a shaper to insure that the cylindrical form of the thin tube-wall shall be maintained or restored if it should be slightly thrown out of shape under the strain of the cutter, and it will be noticed that the diameter of the abutment or head portion is substantially the same as is the diameter from the edge of the cutter to the opposite points of the interior wall. By preference the cutter is formed by reducing to a sharp edge the curved metal at the forward edge of the head portion.

What I claim is—

1. A broaching-tool for acting on the concave surface of a tube or the like, it having a mandrel or power-transmitting bar, in combination with a head having a cutter, the cutting edge of which is flush with the adjacent surface of the head, means radially opposed to the cutter and advancing therewith and bearing against the inner surface of the tube for holding the cutter to its work, and a guide to prevent rotation of the cutter, substantially as set forth.

2. A broaching-tool for acting on and removing inwardly-projecting metal from the concave surface of a tube or the like, it having a power-transmitting bar, in combination with a head having a cutter secured thereto and having its cutting edge flush with the surface of the head in rear of the cutter, and adapted to remove metal along a line parallel to the axis of the tube, means on said head adapted to bear against the tube at points radially opposed to said line of cut, and means adapted to engage with the metal of the tube to prevent rotation of the cutter, substantially as set forth.

3. The herein-described tool for removing inwardly-projecting metal from the concave surface of a tube or the like by means of a rectilineal cut, it having a cutter-head having a cutting edge situated at a distance from the axis of the tube equal to the radius of the tube, more or less of the exterior surface of said head, on opposite sides of the cutter being that of a cylinder of a diameter equal to that of the tube, whereby said head can bear properly against the interior surface of the tube in every direction radially, and a power-transmitting bar or mandrel connected to the head for moving it through a tube, substantially as set forth.

4. A broaching implement having a non-rotary rectilineally-moving body of such size at its ends as to fit snugly within a tube, an intermediate reduced portion connecting said ends, a guiding groove or way, $b$, extending from the chamber formed between the reduced portion of the implement and the wall of the tube being acted on through one end of the implement, and a cutter arranged at the opposite end of said reduced portion and having its cutting edge flush with the surface of the adjacent end portion, said body being adapted to be rigidly attached to a mandrel or power-transmitting bar, substantially as set forth.

5. In a broach or implement for smoothing the inner face or surface of a tube by removing inwardly-extending projections from such surface, the combination of a head provided with a cutter the operative edge of which is arranged to travel through a path parallel to the axis of the tube and at a distance from said axis equal to the radius of the cleaned tube, the body of said head having one or more smooth-surfaced portions adapted to contact with and ride along the inner smoothed surface of the tube in the rear of and at points radially opposed to the said cutting edge, and a bar or rod connected with said head and adapted to move the same longitudinally of the tube, substantially as set forth.

In testimony whereof I affix my signature in presence of two witnesses.

WILLIAM A. McCOOL.

Witnesses:
JOHN W. CULMER,
JAMES F. MERRIMAN.